United States Patent [19]

Stewart et al.

[11] 3,903,367

[45] Sept. 2, 1975

[54] POWER CONTROL CIRCUITRY FOR SUBSCRIBER CARRIER TELEPHONE SYSTEMS

[75] Inventors: James A. Stewart, Menlo Park; William S. Lee, San Jose, both of Calif.

[73] Assignee: GTE Automatic Electric Laboratories Incorporated, Northlake, Ill.

[22] Filed: Jan. 25, 1974

[21] Appl. No.: 436,561

[52] U.S. Cl. ............................................ 179/2.5 R

[51] Int. Cl.$^{2}$ ........................................ H04H 1/08

[58] Field of Search ........... 179/2.5 R, 170.2, 170.8, 179/26; 328/127, 150

[56] References Cited

UNITED STATES PATENTS

| | | | |
|---|---|---|---|
| 3,510,584 | 5/1970 | Krasin et al. | 179/2.5 R |
| 3,624,300 | 11/1971 | Krasin et al. | 179/2.5 R |

*Primary Examiner*—Kathleen H. Claffy
*Assistant Examiner*—Joseph Popek
*Attorney, Agent, or Firm*—Leonard R. Cool; Douglas M. Gilbert; Russell A. Cannon

[57] ABSTRACT

The control circuit comprises: a first transistor, a delay circuit, and a voltage divider that are connected in series between a supply voltage and a reference voltage; and a second transistor that is responsive to the voltage on the divider and conduction of the first transistor for conducting to energize a loop relay. The delay circuit comprises the parallel combination of a resistor and capacitor that are connected in series with the first transistor and divider, and are connected across the base-emitter junction of a third transistor. The integrator averages output current of the first transistor for turning on the third transistor to connect the supply voltage therethrough to a carrier oscillator only in response to input signals to the first transistor that have a duration greater than a prescribed value that is set by the integrator. The output of the third transistor is coupled to the oscillator through a decoupling diode that prevents conduction in the reverse direction through the collector-base junction of the former which may then deenergize the relay and open the central office loop.

10 Claims, 3 Drawing Figures

CENTRAL OFFICE TERMINAL

SUBSCRIBER STATION TERMINAL

POWER CONTROL CIRCUITRY FOR SUBSCRIBER CARRIER TELEPHONE SYSTEMS

BACKGROUND OF THE INVENTION

This invention relates to subscriber carrier equipment for telephone communications such as is described in the article, "A single Channel Station Carrier System for Permanent Service Applications" by James A. Stewart, International Conference on Communications, June 11 – 13, 1973, ICC '73 Conference Record, volume 1, pages 4–6 to 4–10. More particularly, this invention relates to power control circuitry in the central office terminal of such subscriber carrier equipment.

In the subscriber carrier telephone system described in the ICC '73 article (supra), a single carrier-derived subscriber channel is added to a cable pair without displacing the physical circuit subscriber channel already on the cable pair. Block diagrams of the central office and station terminals of such a subscriber carrier telephone system are shown in FIGS. 1 and 2, respectively. The central office is notified of an off-hook condition of the carrier channel handset by transmitting a constant 28 kHz carrier signal from a carrier station terminal to a central office carrier terminal. This 28 kHz signal is detected to produce a DC signal voltage that energizes a 76 kHz central office carrier generator and closes a central office loop relay. Dial pulses from the carrier subscriber handset are transmitted to the central office carrier terminal by selectively pulsing the 28 kHz carrier generator on and off. The 28 kHz carrier pulses are detected in the central office carrier terminal to produce DC pulses that alternately open and close the loop relay to connect the dial pulses to central office equipment. These DC pulses may also turn the 76 kHz central office carrier generator on and off and cause false ringing of the bell in the carrier channel handset. Such operation of the system is annoying and undesirable. It has been found that a momentary short circuit on the cable pair produces a short pulse signal thereon having energy at all frequencies. Such a condition can occur when a repairman drops a conductive tool such as a pair of pliers across a cable pair or associated lines in the central office. Since such a pulse signal contains energy at 28 kHz, this pulse signal is detected in the central office terminal which produces a short DC pulse that momentarily turns on the 76 kHz central office carrier generator. This 76 kHz pulse of carrier signal is similar to a ringing pulse signal and therefore causes a tap of the bell in the carrier channel handset. Such operation of this system is also annoying and undesirable. An object of this invention is the elimination of such undesirable conditions in a carrier-derived subscriber channel.

BRIEF DESCRIPTION OF DRAWINGS

This invention will be more fully understood from the following detailed description of a preferred embodiment thereof together with the drawings in which.

DESCRIPTION OF PREFERRED EMBODIMENT

The description of the subscriber carrier telephone system in the ICC '73 article (supra) is incorporated herein by reference. This article also appears in the IEEE Transactions of the Communications Society, March 1974, volume COM-22, no. 3, pages 312 to 319; and under a different title in the GTE Automatic Electric Technical Journal, July 1974, volume 14, no. 3, pages 135 to 142. This subscriber carrier telephone system is generally illustrated by the block diagrams in FIGS. 1 and 2.

Figure 1:
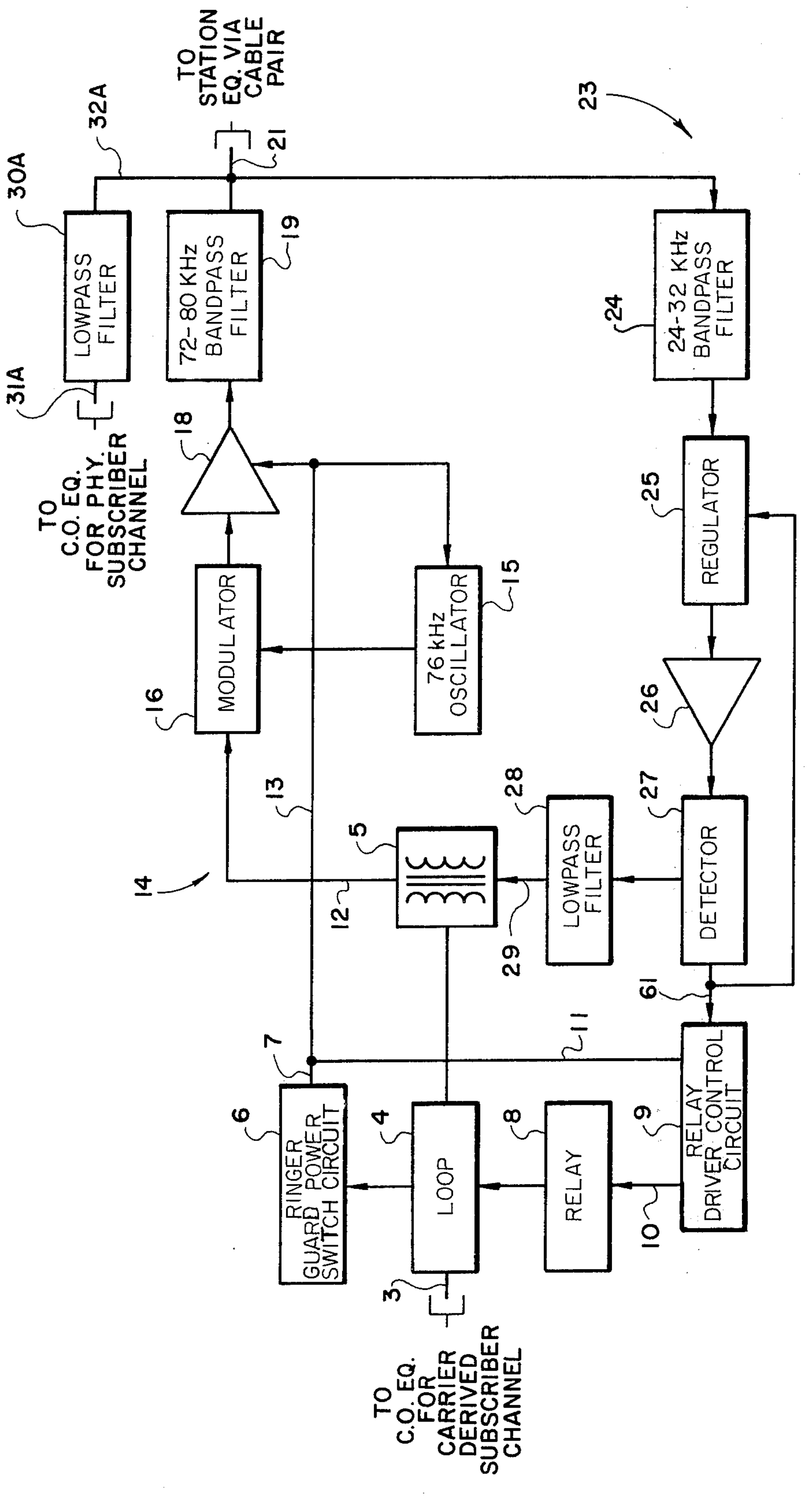
FIG. 1 is a block diagram of the central office terminal of a single channel subscriber carrier system.

Referring now to FIG. 1, the central office terminal of a carrier-derived subscriber channel typically comprises a subscriber loop 4 that is connected on lines 3 to central office equipment for this carrier subscriber channel; a voice frequency (VF) hybrid circuit 5, ringer guard-power switch circuit 6, and relay 8 that are associated with loop 4; a circuit 9 for driving relay 8 and for applying on line 11 power to other equipment in the central office terminal; a transmitter section 14 including a 76 kHz oscillator 15, and a modulator 16, power amplifier 18, and 72 – 80 kHz bandpass filter 19 which are connected in series between the output line 12 of hybrid circuit 5 and the line 21 which is connected to a cable pair; and a receiver section 23 including a 24 – 32 kHz bandpass filter 24, regulator 25, power amplifier 26, detector 27, and VF lowpass filter 28 which are connected in series between the cable pair (line 21) and the input line 29 to hybrid circuit 5. The physical subscriber circuit in the central office terminal comprises a VF lowpass filter 30A that is connected through line 31A to central office equipment for the physical subscriber channel and on line 32A to the cable pair. Similarly, the station terminal at the carrier subscriber facility (see FIG. 2) comprises a VF hybrid circuit 35, power switch 36, and ringer power generator circuit 39 which are associated with a subscriber loop circuit 34; a receiver section 53 including a 72 – 80 kHz bandpass filter 54, regulator 55, power amplifier 56, detector 57, and VF lowpass filter 58 which are connected in series between the cable pair (line 51) and the input line 59 to hybrid circuit 35; and a transmitter section 44 including a 28 kHz oscillator 45, and a modulator 46, regulator 47, power amplifier 48, and 24 – 32 kHz bandpass filter 49 that are connected in series between the output line 42 of hybrid circuit 35 and the line 51 which is connected to the cable pair. The physical subscriber circuit of the subscriber station terminal comprises a VF lowpass filter 30B that is connected through line 31B to an associated handset and on line 32B to the cable pair. An output of the detector 57 is applied on line 64 to the ringer generator 39 which is described in detail in the patent application entitled Ringer Power Generator Circuit for Subscriber Carrier Station Terminal (L-340), Ser. No. 433,984, filed Jan. 16, 1974, by James A. Stewart and Neale A. Zellmer, and assigned to the assignee of this application. The drop circuit to the carrier channel handset includes only two wires 33.

Figure 2:
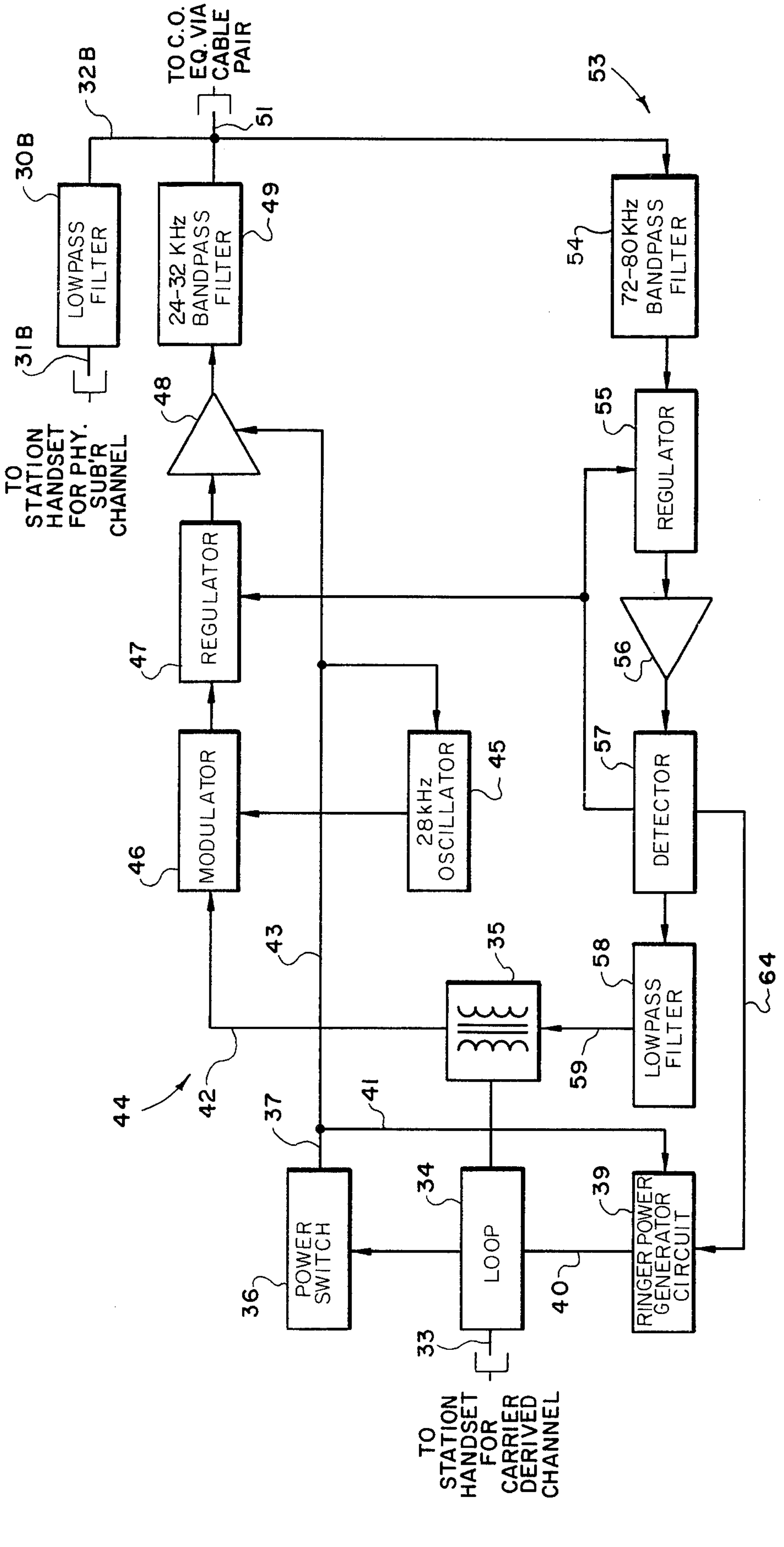
FIG. 2 is a block diagram of the subscriber station terminal of a single channel subscriber carrier system; and, FIG. 3 is a circuit and block diagram of the central office terminal in FIG. 1.

Briefly, the system in FIGS. 1 and 2 adds a single carrier channel to the cable pair between lines 21 and 51 without displacing the physical channel comprising the lowpass filters 30A and 30B and the cable pair. The carrier channel transmits a pulsed 76 kHz carrier signal from the central office terminal carrier oscillator 15 for causing ringing of the associated carrier subscriber handset (not shown), and transmits steady 28 kHz carrier from the station terminal carrier oscillator 45 when the carrier subscriber handset is off hook. Pulsed 28 kHz carrier is transmitted by the station terminal during dialing by the carrier channel subscriber handset. The mechanism for transmitting VF signals in the physical and carrier channels between the central office and subscriber handsets is known in the art.

The operation of the system in FIGS. 1 and 2 will now be described in somewhat more detail. The lowpass filters 30A and 30B in FIGS. 1 and 2, respectively, pass VF signals in the physical channel on the associated lines 31A, 32A, and 31B, 32B. These filters 30A and 30B block 28 kHz and 76 kHz carrier signals, however, on lines 21 and 51, respectively. The power switch 36 in FIG. 2 causes oscillator 45 to transmit a 28 kHz carrier signal to the central office terminal in FIG. 1 only when the carrier channel handset is off hook and current is flowing in loop 34.

The circuit 6 in FIG. 1 applies power on lines 7 and 13 to the 76 kHz carrier oscillator 15 and amplifier 18 when a central office ringing signal is received on line 3. The circuit 9 applies power on lines 11 and 13 to the 76 kHz oscillator 15 and amplifier 18 when a continuous 28 kHz carrier signal is received on line 21 from the station terminal. When the carrier channel handset in on-hook, a 20 Hz central office ringing signal on line 3 in FIG. 1 pulses circuit 6 on and off to alternately apply power on line 7 which pulses oscillator 15 and amplifier 18 on and off. Since no voice signals are present on line 3 at this time, pulses of 76 kHz carrier signal occurring at the 20 Hz ringing frequency are produced on line 21. A typical ringing signal on line 21 is alternately a 2-second ringing period made up of bursts of 76 kHz carrier signal occurring at the 20 Hz rate, and a 4-second silent period during which the 76 kHz carrier signal is absent, the ringing and silent periods of a ringing cycle being set by an interrupter circuit in the central office. It is desirable that circuit 6 and oscillator 15 not be energized for producing pulses of 76 kHz carrier signal by longitudinal noise signals on line 3. The pulses of 76 kHz carrier signal received on line 51 in FIG. 2 are detected by circuit 57 which produces low voltage DC pulses on line 64 that cause the ringer power generator circuit 39 to produce a high voltage ringer voltage on line 33 which energizes a bridged ringer in the carrier channel handset. When this handset goes off-hook and current flows in loop 34, the circuit 36 is activated to energize oscillator 45 which produces a continuous 28 kHz signal on line 51. This signal is detected by circuit 27 in FIG. 1 which produces on line 61 a DC signal that enables circuit 9. If the 28 kHz signal is present on line 21 for a predetermined time interval set by circuit 9, the latter applies power on line 11 to continuously energize oscillator 15. Circuit 9 also produces a signal on line 10 which drives relay 8 to connect the hybrid circuit 5 across the tip and ring leads of loop 4, and thus to initiate central office ring trip. It is desirable that transient signals on the cable pair, for example, not energize circuit 9 and oscillator 15 momentarily so as to produce DC pulse signals on line 64 in FIG. 2 which cause tapping of the bell in the carrier subscriber handset. The mechanism for transmitting voice signals on the physical and carrier channels between the central office and subscriber terminals is known in the art.

Figure 3:
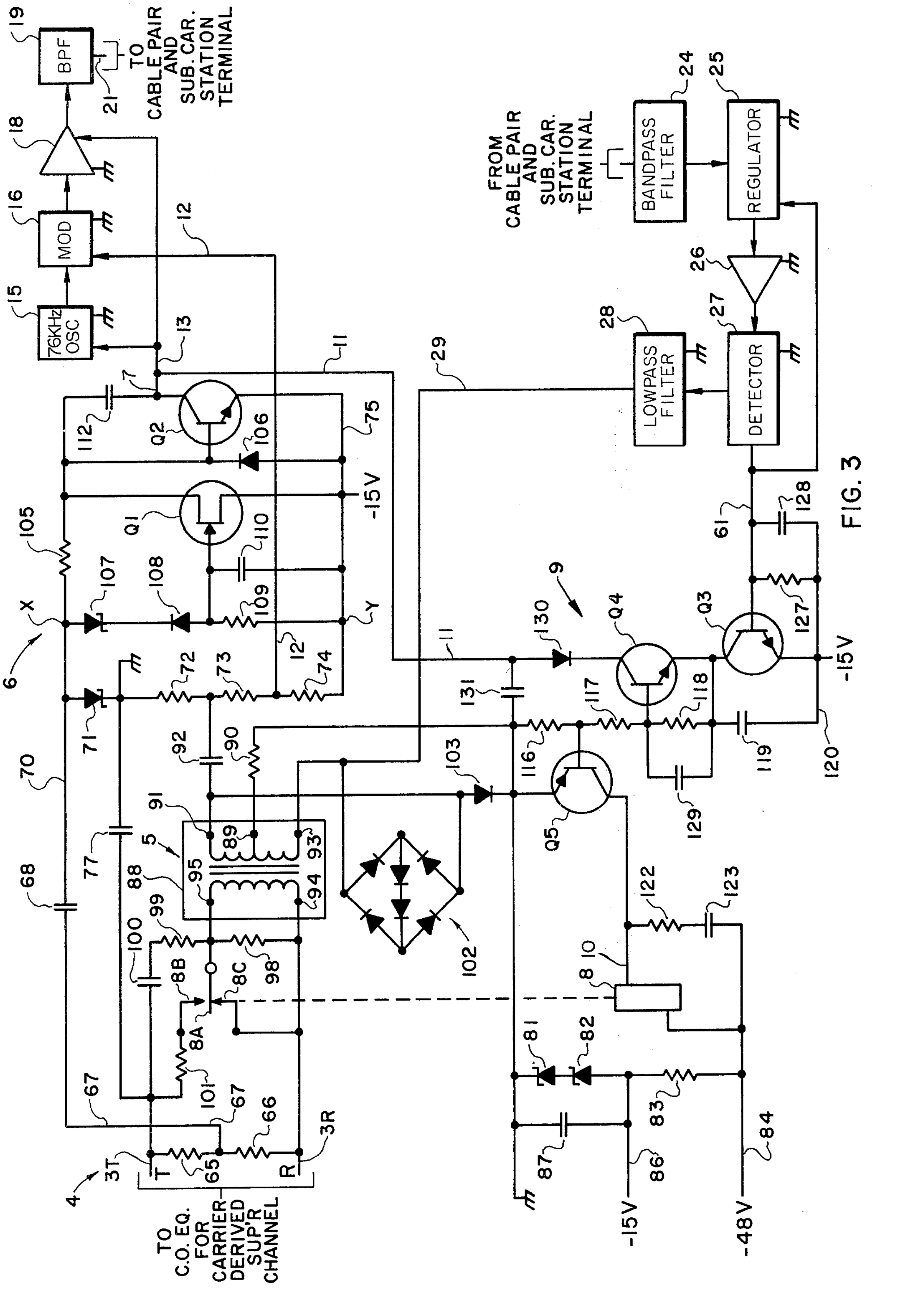

The circuits associated with the carrier channel in the central office terminal are shown in more detail in the schematic and circuit diagram in FIG. 3. A voltage divider comprising resistors 65 and 66 is connected across the tip and ring lines 3T and 3R, respectively, of the central office drop for dividing down a 20 Hz central office ringing voltage thereon. The divided voltage on line 67 is coupled through AC coupling capacitor 68 to line 70 of the ringer guard-power switch circuit 6. In this manner, essentially one-half of the ringing voltage on lines 3T and 3R is coupled to line 70 regardless of which one of the tip and ring lines is grounded. A 33 volt Zener diode 71 is connected between line 70 and the ground reference potential. A second voltage divider comprising resistors 72, 73 and 74 is connected between ground and a negative supply voltage on line 75. The supply voltage may, by way of example, be −15 volts. The diode 71 is employed to protect a depletion type field effect transistor (FET) Q1 in circuit 6 in the event that an overvoltage such as may be caused by lightning is coupled across the drop lines 3T and 3R and thus to line 70. Diode 71 causes the input voltage to circuit 6 to essentially vary symmetrically about the −15 volt supply voltage by clipping the line 70 voltage to ground and to −33 volts on positive and negative half cycles, respectively, of a central office ringing voltage. Capacitor 77 is connected between the tip line 3T and ground to improve the longitudinal balance on the central office drop lines 3T and 3R.

The −15 volts supply voltage is produced in the carrier channel central office terminal by connecting a pair of 7.5 volt Zener diodes 81 and 82 and a resistor 83 in series between ground and the −48 volt central office battery voltage on line 84. The −15 volt signal is coupled on line 86 from the junction of diode 82 and resistor 83. A capacitor 87 is connected across diodes 81 and 82 for filtering out any variations in the voltage on line 86.

The hybrid circuit 5 comprises a hybrid transformer 88 having a reference terminal 89 connected through balancing resistor 90 to ground. The other output terminal 91 of transformer 88 is connected through VF coupling capacitor 92 to the junction of resistors 72 and 73. The output of hybrid circuit 5 is coupled on line 12 from the other side of resistor 73. The other input terminal 93 of transformer 88 is connected to the output line 29 of filter 28. A pad comprising the series combination of resistors 98 and 99 and capacitor 100 is connected across the drop lines 3T and 3R with resistor 98 being across the central office drop side of transformer 88. The pad is employed to improve VF response by emphasizing 3 kHz frequency components of VF signals and to increase the return loss of the central office drop.

The contact 8B of relay 8 is connected through resistor 101 to line 3T. The other relay contact 8C is connected directly to the other drop line 3R and to the terminal 94 of the transformer 88. The movable arm 8A of the relay is connected to the other drop side terminal 95 of transformer 88. The resistor 99 and capacitor 100 also protect the relay contacts. The arm 8A of the relay is connected as shown in FIG. 3 during both idle and ringing conditions in the carrier subscriber channel. Relay arm 8A is moved to contact 8B to connect the hybrid transformer directly across the tip and ring lines in order to close the central office loop when the carrier subscriber handset is off-hook. The relay arm 8A is alternately switched between contacts 8B and 8C during dialing that is initiated by the carrier subscriber handset.

A diode bridge 102 is connected across the hybrid transformer winding between terminals 91 and 93. In a typical central office carrier terminal, transients produced on drop lines 3T and 3R during battery reversal may be coupled through hybrid transformer 88, line 29 and VF filter 28 to detector 27 to turn off the latter. This interruption of the DC signal voltage on line 61 allows relay 8 to deenergize and the connection between contacts 8B and arm 8A to open. This breaking of the central office loop causes central office equipment (not shown) to drop the switch train and lose the connection associated with the carrier subscriber channel. Diode bridge 102 is employed to prevent such transient signals being coupled to detector 27 and the occurrence of such a condition. The diode 103, which is connected between hybrid terminal 91 and ground, is employed to protect capacitor 92 from transient voltages of polarity that would destroy the polarized capacitor 92.

The primary function of the ringer guard-power switch circuit 6 is to alternately connect the −15 volt supply potential on line 75 to line 7 and 13 to alternately energize and deenergize carrier oscillator 15 and amplifier 18 during application of a central office 20 Hz ringing signal on the drop lines 3T and 3R for sending pulses of 76 kHz carrier signal to the carrier subscriber station terminal in FIG. 2 to cause ringing of the associated handset and to prevent false ringing thereof. Circuit 6 comprises an output transistor Q2 having its emitter electrode connected to line 75 and its base electrode connected through resistor 105 to line 70; and, an FET Q1 having its drain and source electrodes connected across the Q2 base-emitter junction. A diode 106 is also connected across the Q2 base-emitter junction. The Q1 gate electrode is connected through diodes 107 and 108 to line 70 and through resistor 109 and capacitor 110 to line 75. A Miller capacitor 112 is connected across the Q2 collector and base electrodes for slowing down turn-on and turn-off thereof in order to reduce overshoot and transients in the Q2 collector voltage. The output of the ringer guard circuit 6 is coupled on line 7 from the Q2 collector electrode.

Q1 is a depletion type FET that is on in the idle condition of the carrier channel for presenting a very low source-to-drain resistance of approximately 100 ohms which essentially latches Q2 by clamping its base electrode to its emitter electrode. This keeps Q2 from being turned on during this idle condition. Q1 is turned off by ringing signals on line 70 that are greater than a prescribed threshold level. This causes Q1 to present a large source to drain resistance of a few megohms between the Q2 base and emitter electrodes that unlatches Q2 so that conduction thereof is then controlled by the coupled ringing voltage on line 70. Diode 106 provides a current path for discharging capacitor 68 through resistor 105 during negative half cycles of ringing voltage on line 70 in order to maintain Q2 cut off. Q2 conducts and diode 106 is nonconducting during positive half cycles of ringing voltage on line 70. Resistor 109 and capacitor 110 are employed to maintain Q1 off during receipt of a coupled ringing voltage on line 70. During conduction of Q2, the −15 volt supply voltage on line 75 is connected through Q2 to the output line 7 of circuit 6. Q2 presents an open circuit between lines 7 and 75 when it is cut off.

Q1 is basically a control element which controls whether Q2 can conduct. Whatever type of element Q1 is employed here, it is desirable that it be easily disabled (turned off) in order to enable Q2 for a time interval that is at least several times longer than the 50 millisecond period of the 20 Hz ringing signal. A bipolar transistor has a low base-to-emitter resistance of the order of 1000 ohms. This means that an extremely large capacitor 110 of the order of 200 microfarads is required to obtain an RC time constant of 200 milliseconds, for example, that is associated with the off-condition of Q1. It is impractical to employ a 200 microfarad capacitor, which is physically large, in this application. An FET, however, has a gate-to-source resistance of approximately 100 megohms in the off-condition. This means that an associated 2 nanofarad capacitor 110 may be employed to obtain the desired 200 millisecond RC time constant associated with the off-condition of Q1. Since this gate-to-source resistance of FET Q1 is extremely large and varies from transistor to transistor, a resistor 109 is employed in parallel with this resistance of Q1 and capacitor 110 in order to adjust the values thereof to be more acceptable for obtaining RC time constants of up to as long as 1 second.

An FET is a threshold type device that typically will turn off for gate-to-source reverse bias voltages of greater than from somewhere between 2 volts and 6 volts. This means that some FET's will turn off for gate-to-source reverse bias voltage of greater than or equal to as low as 2 volts, whereas all FET's will turn off for reverse bias voltages of greater than or equal to 6 volts. It is questionable whether all FET's will turn off for bias voltages that are between 2 volts and 6 volts. Diode 107 is a 12 volt Zener diode, for example. This diode effectively increases the threshold level that the voltage on line 70 must exceed to bias Q1 off in order to unlatch (enable) Q2. Diode 108 prevents current flow between lines 70 and 75 for positive half cycles of a ringing voltage which would discharge capacitor 110. Diode 108 allows a Zener current to flow between lines 75 and 70, however, for negative half cycles of the ringing voltage on line 70 in order to charge capacitor 110. Resistor 109 provides a path for discharging the capacitor 110 when the diodes 107 and 108 are nonconducting. The RC time constant of resistor 109, capacitor 110, and the Q1 gate-to-source resistance in the off-condition is much greater than the 50 millisecond period of a 20 Hz ringing signal so that the voltage on capacitor 110 holds Q1 off in order to enable Q2 for a time interval that is greater than the period of the ringing signal.

Assuming that a central office ringing voltage E is applied across the tip and ring lines 3T and 3R (one of which is grounded) and that the resistances of resistors 65 and 66 are the same values R, the divided voltage across one of these resistors is representable as the series combination of a source of voltage E/2 and a source resistance R/2 feeding the network between nodes X and Y. The voltage E' across resistor 105 and diode 106 (between nodes X and Y) is representable as:

$$E' = I\,R_n + V_{D106} \quad (1)$$

$$= \left( \frac{(E/2) - 0.7}{R_n + (R/2)} \right) R_n + 0.7 \quad (2)$$

-Continued $$= E \left( \frac{R_n}{2R_n + R} \right) - 0.7 \left( \frac{R}{2R_n + R} \right) \quad (3)$$

where I is the current through the source resistance,
R is the resistance of resistors 65 and 66,
$R_n$ is the resistance of network resistor 105,
$V_{D106} = 0.7$ volts is the voltage across diode 106, and
E is the ringing voltage on lines 3T, 3R.

This voltage E' between nodes X and Y is also representable, however, as:

$$E' = V_{D107} + V_{D108} + V_{Q1th} \quad (4)$$
$$= 12 + 0.7 + 2 = 14.7 \text{ volts}$$

and $$= 12 + 0.7 + 6 = 18.7 \text{ volts} \quad (6)$$

for the range of voltages over which turn-off of the FET Q1 may occur; and wherein $V_{D107}$ is the Zener voltage across diode 107, $V_{D108}$ is the voltage across diode 108, and $V_{Q1th}$ is the gate-to-source voltage at which Q1 is turned off. Stated differently, some FET's Q1 will turn off with a gate-to-source reverse voltage of greater than or equal to 2 volts, but all FET's Q1 will turn off for a gate-to-source reverse bias voltage of greater than or equal to 6 volts. Turn-off is questionable for bias voltages between 2 volts and 6 volts.

Setting equations 3 and 5 equal and solving for E, $$E = \frac{2R_n + R}{R_n} \left( 14.7 + 0.7 \frac{R}{2R_n + R} \right) \quad (7)$$

Assuming values of 48 kohms and 16 kohms for R and $R_n$, respectively, the minimum peak voltage on drop lines 3T and 3R for which an FET Q1 may turn off is 75 volts. Similarly, the peak voltage on the drop lines above which any FET Q1 will turn off is 95.6 volts. The corresponding RMS voltages are 52.5 volts and 67 volts. If the Zener diode 107 is omitted from the circuit 6, the ratio of maximum-to-minimum voltages (15.6 to 35.6 volts) on lines 3T and 3R over which Q1 may change operating states is approximately 2.3. By employing diode 107 to increase the turn-off threshold levels of Q1, however, the ratio of maximum-to-minimum voltage on lines 3T and 3R over which Q1 may change operating states is reduced to approximately 1.3. This ratio defines the precision of the threshold detector. By way of example, if it is desired for the channel to ring with E > 70 volts and not ring with E < 40 volts, a ratio of ≤ 70/40 = 1.75 is required.

The primary function of the relay driver-control circuit 9 is selectively to energize relay 8. A second function of circuit 9 is to connect a −15 volt supply potential to line 11 for energizing oscillator 15 and amplifier 18 in response to DC voltages on line 61, e.g., when the carrier channel handset is off hook or is dialing. Circuit 9 comprises control transistor Q3, delay transistor Q4, and relay drive transistor Q5. All of the transistors Q3, Q4, and Q5 are cut off during idle operation of the carrier subscriber channel when the associated handset is on hook.

Resistors 116, 117, and 118 and capacitor 119 are connected in series between ground and line 120. The base-emitter junction of Q5 is connected across resistor 116. The Q5 collector electrode is connected through relay 8, and through resistor 122 and capacitor 123 to the central office battery voltage on line 84. The capacitor 119 is connected across the emitter and collector electrodes of Q3. The capacitor 119 adjusts the percent break of the relay 8. Capacitor 119 discharges rapidly through Q3 during conduction thereof, and charges slowly through resistors 116, 117, and 118 when Q3 is cut off. The parallel combination of a resistor 127 and capacitor 128 is connected across the base-emitter junction of Q3 for filtering out high-frequency components of DC voltage pulses on line 61. A capacitor 129 is connected across resistor 118 and the base emitter junction of Q4 for integrating current through resistor 118. Q4 is caused to conduct when the charge on capacitor 129 exceeds approximately 0.6 volts. The Q4 collector electrode is connected through diode 130 to line 11. Diode 130 prevents Q4 conducting through its collector-base junction and through resistors 117 and 116 to ground during ringing when Q2 is conducting for connecting the −15 volt supply potential on line 75 to line 7 and thus line 11. Such a condition is undesirable since it could cause Q5 to conduct and initiate ring trip in the central office. A capacitor 131 is connected between line 11 and ground for filtering out variations in the −15 volt supply potential when it is connected to lines 7 and 11.

DC pulse voltages are produced on line 61 that correspond to dial pulses from the carrier station terminal that typically have 40 millisecond make periods and 60 millisecond break periods. Q3 conducts to pass current through the resistors 116 – 118 during the make periods and is cut off during break periods. The RC time constant associated with charging of capacitor 129 through resistors 116 and 117 is greater than that associated with discharge of this capacitor through resistor 118 so that the capacitor 129 averages current through the resistors during pulsing of Q3. These time constants are selected so that capacitor 129 will not charge up to the prescribed 0.6 volt level required to start Q4 into conduction during the generation of dial pulses. By way of example, the charge and discharge time constants associated with capacitor 129 may be 2 seconds and 180 milliseconds, respectively. A DC pulse signal also may be produced on line 61 in response to a signal on the cable pair that is caused by a repairman dropping an electrically conductive tool such as a pair of pliers across the cable pair. The duration of the transient portion of such a signal which contains 28 kHz frequency components is nominally 3 – 4 milliseconds long. Since the duration of this transient condition is considerably less than the make period of a dial pulse, it does not cause Q4 to conduct.

The operation of circuits 6 and 9 will now be considered. During idle conditions in the carrier subscriber channel when the associated handset is on-hook, Q3, Q4, and Q5 are cut off and Q1 is on to hold Q2 cut off. This means that the −15 volt negative supply potential on lines 75 and 120 is not applied to lines 7 or 11. The 76 kHz carrier oscillator 15 is therefore not energized and the contacts of relay 8 are in the position shown in FIG. 3.

When a central office ringing voltage is produced on the tip and ring lines 3T and 3R, a divided ringing voltage on line 67 is coupled to line 70 of circuit 6. The positive and negative half-cycles of divided ringing voltage are clipped to ground and −33 volts, respectively, by diode 71. If the first half-cycle of ringing voltage is positive, diode 108 is reverse-biased and nonconducting. When the line 70 voltage with respect to the −15 volt potential on line 75 is more negative than approximately −28 volts (−15 volts on line 75 plus −13 volts for Zener diode 107) on the first negative half-cycle of ringing voltage, Zener diode 107 breaks down and conducts to pass a current through diode 108 which charges capacitor 110. When the voltage on capacitor 110 exceeds the Q1 source-to-gate reverse bias cutoff voltage of somewhere between 2 and 6 volts, Q1 is turned off to present a large impedance across the Q2 base-emitter electrodes and thereby unlatch Q2. During subsequent positive half-cycles of ringing voltage, diode 108 is reverse-biased and nonconducting. Capacitor 110 discharges slowly through resistor 109 when diode 108 is nonconducting, however, for maintaining Q1 off so that operation of Q2 is controlled by the central office ringing signal.

During alternate negative half-cycles of ringing voltage on line 70, diode 106 is forward-biased and conducts through resistor 105 to short-circuit the Q2 base-emitter junction and hold Q2 cut off. During alternate positive half-cycles of the ringing voltage, however, diode 106 is reverse-biased and nonconducting. The Q2 base-emitter junction is forward-biased by the voltage on resistor 105 during these positive half-cycles of ringing voltage for causing Q2 to conduct to connect the −15 volt supply potential on line 75 to line 7 in order to turn on oscillator 15 and amplifier 18. Thus, Q2 is alternately driven into conduction and cutoff during positive and negative half-cycles of a central office ringing voltage on line 70 for pulsing the 76 kHz carrier oscillator 15 and amplifier 18 on and off at a 20 Hz rate in order to produce a ringing signal in the associated carrier subscriber station terminal.

If a very large voltage, such as may be caused by lightning or some other transient condition, is coupled to line 70, Zener diode 71 breaks down to clamp the line 70 voltage to ground or to −33 volts to thereby protect the FET Q1. Since such a transient condition is of a single polarity, it does not cause Q2 to conduct to apply the −15 volt supply potential on line 75 to line 7 and the oscillator 15 and amplifier 18. Thus, such a transient voltage is prevented from momentarily turning on oscillator 15 and amplifier 18 and causing tapping of the bell in the carrier channel subscriber handset.

Longitudinal AC noise voltages that may be induced in the central office drop wires 3T and 3R typically have been found to have peak values of less than 40 volts. The minimum peak value of threshold voltage associated with Zener diode 107 and FET Q1, translated to the drop lines 3T and 3R, however, is 75 volts. Such a longitudinal noise voltage is therefore not sufficient to break down Zener diode 107 and cause it to conduct. Q1 therefore maintains Q2 cut off for preventing application of the −15 volt supply potential to oscillator 15 and amplifier 18. In this manner, circuit 6 prevents false ringing of the carrier subscriber handset during receipt of such noise signals.

During idle conditions in the carrier subscriber channel, the associated handset is on hook and the detector 27 output voltage on line 61 maintains Q3 cut off. When the carrier subscriber channel handset is off hook, the continuous 28 kHz signal from oscillator 45 causes detector 27 to produce a constant DC voltage on line 61 which maintains Q3 conducting. Conduction of Q3 through resistors 116 – 118 causes Q5 to conduct to energize relay 8 and connect the associated arm 8A to the relay contact 8B. This operation of the relay connects the drop side winding of hybrid transformer 88 across lines 3T and 3R in order to close the central office loop. When the charge averaged by capacitor 129 exceeds the 0.6 volt base-emitter threshold voltage of Q4, the latter conducts through diode 130 to connect the −15 volt supply potential on line 120 to line 11 in order to energize oscillator 15 and amplifier 18. During dialing initiated by the carrier subscriber handset, pulses of 28 kHz carrier cause detector 27 to produce DC pulse voltages on line 61 which cause Q3 to be alternately conducting and cut off. Similarly, Q5 is caused to alternately conduct and be cut off to drive relay 8 so as to alternately connect the arm 8A between the relay contacts 8B and 8C at a prescribed rate. Q4 is maintained cut off, however, during pulsing by the voltage in capacitor 129.

If a telephone repairman drops a conductive tool such as a pair of pliers across the cable pair, for example, a transient signal is produced which may contain 28 kHz frequency components. Such signals are passed by filter 24 and detected by circuit 27 to produce a pulse of DC voltage on line 61 which is nominally a few milliseconds long. This signal causes Q3 to conduct through resistor 118 and causes the capacitor 129 to charge. Since the RC time constant of resistor 118 and capacitor 129 is much greater than the duration of this transmit DC pulse signal on line 61, however, Q3 is cut off prior to capacitor 129 being charged sufficiently to cause Q4 to conduct. In this manner, circuit 9 prevents application of the −15 volt supply potential on line 120 to oscillator 15 and amplifier 18 when such transient signals are produced on the cable pair and thus prevents tapping of the bell in the carrier subscriber handset.

What is claimed is:

1. A control circuit for a subscriber carrier telephone system for selectively connecting a source of voltage to an output line in response to an input voltage that is a constant DC signal voltage corresponding to an off-hook condition in a carrier subscriber handset, comprising:

first transistor means selectively responsive to input voltages for passing a signal current between the voltage source and a ground reference potential;

means for integrating the signal current passed by said first transistor means for producing a control voltage that is a measure of the time average of the signal current; and second transistor means responsive to the control voltage produced by said integrating means for connecting said voltage source to the output line only when the control voltage exceeds a prescribed level for a DC input voltage having a duration that is greater than a prescribed value.

2. The circuit according to claim 1 wherein said first means comprises a first transistor having a base electrode receiving the input voltages and having one of its emitter and collector electrodes electrically connected to the voltage source and the other electrode electrically connected to ground.

3. The circuit according to claim 2 wherein said integrating means comprises a first resistor and the parallel combination of a first capacitor and second resistor, said first and second resistors being connected in series with said first transistor collector and emitter electrodes through said first transistor for passing therethrough the signal current passed by said first transistor.

4. The circuit according to claim 3 wherein said second means comprises a second transistor having one and the other of its emitter and collector electrodes electrically connected to one and the other of the output line and the one of said first transistor emitter and collector electrodes that is spaced from the voltage source, and having a base-emitter junction electrically connected across said second resistor for selectively conducting to connect the source voltage through said first and second transistors to the output line when the control voltage exceeds the prescribed level.

5. The circuit according to claim 4 including a decoupling diode electrically connected in series between the output line and the one of said second transistor emitter and collector electrodes that is connected to the output line.

6. The circuit according to claim 5 including a second capacitor connected between ground and the side of said diode that is electrically connected to the output line.

7. A power control circuit for a subscriber carrier telephone system for selectively energizing an oscillator in response to input voltages that are DC signal voltages corresponding to off-hook conditions in a carrier subscriber handset and having durations that are greater than the durations of DC pulse voltages corresponding to dial pulses from the handset and to transient signals, comprising:

a source of supply voltage;

a first transistor having collector and emitter electrodes, and having a base electrode receiving input voltages;

first means electrically connecting one and the other of said first transistor emitter and collector electrodes to said voltage source and a ground reference potential, respectively;

said first transistor being selectively responsive to input voltages for conducting between ground and said voltage source;

second means in the series connection of said first transistor between said voltage source and ground for integrating output signal current of said first transistor and producing a control voltage which is a measure of the integrated signal; and third means, which is a switching means, responsive to the control voltage produced by said second means for selectively connecting the source voltage through said first transistor to an output terminal for energizing the oscillator when the magnitude of the control voltage exceeds a prescribed level, the build-up and decay times of said second means being greater than the durations of DC voltage pulses corresponding to dial pulses and to transient signals.

8. The circuit according to claim 7 wherein said third means comprises a second transistor having collector, base, and emitter electrodes, the control voltage from said second means being electrically connected across said second transistor base emitter junction, said output terminal being connected to said second transistor collector electrode, said second transistor selectively conducting when the control voltage exceeds the prescribed level.

9. The circuit according to claim 8 wherein said second means is a leaky integrator comprising a first resistor and the parallel combination of a capacitor and second resistor, said first and second resistors being connected in series in the series connection of said first transistor emitter and collector electrodes between said voltage source and ground, said first resistor controlling the charge time of said capacitor and said second resistor controlling the discharge time of said capacitor.

10. The circuit according to claim 9 including a decoupling diode connected in series with the collector electrode of said second transistor.

* * * * *